(12) United States Patent
Bhogal

(10) Patent No.: US 7,565,650 B2
(45) Date of Patent: Jul. 21, 2009

(54) METHOD, APPARATUS AND COMPUTER PROGRAM PRODUCT FOR DEPLOYING SOFTWARE VIA POST-LOAD IMAGES

(75) Inventor: Kulvir Singh Bhogal, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/692,143

(22) Filed: Oct. 23, 2003

(65) Prior Publication Data
US 2005/0091417 A1 Apr. 28, 2005

(51) Int. Cl.
G06F 9/445 (2006.01)
(52) U.S. Cl. .......... 717/178; 717/172; 717/173
(58) Field of Classification Search .......... 717/172, 717/173, 177–178
See application file for complete search history.

(56) References Cited

U.S. PATENT DOCUMENTS

| | | | |
|---|---|---|---|
| 5,745,568 A | 4/1998 | O'Connor et al. ........ 380/4 |
| 5,903,650 A | 5/1999 | Ross et al. ........ 380/25 |
| 6,078,951 A * | 6/2000 | Pashupathy et al. ........ 709/217 |
| 6,151,643 A | 11/2000 | Cheng et al. ........ 710/36 |
| 6,202,207 B1 | 3/2001 | Donohue ........ 717/11 |
| 6,298,443 B1 * | 10/2001 | Colligan et al. ........ 726/29 |
| 6,457,076 B1 | 9/2002 | Cheng et al. ........ 710/36 |
| 6,487,718 B1 * | 11/2002 | Rodriguez et al. ........ 717/177 |
| 6,519,762 B1 | 2/2003 | Colligan et al. ........ 717/11 |
| 7,143,409 B2 * | 11/2006 | Herrero ........ 717/178 |
| 2002/0158900 A1 * | 10/2002 | Hsieh et al. ........ 345/738 |
| 2003/0028869 A1 * | 2/2003 | Drake et al. ........ 717/177 |

OTHER PUBLICATIONS

"Method and Apparatus for Creating a Preload Image Cross-reference to Related Applications," IBM Patent Application, U.S. Appl. No. 09/118,207, filed Jul. 17, 1998.

* cited by examiner

*Primary Examiner*—Joshua D Campbell
*Assistant Examiner*—Anil N Kumar
(74) *Attorney, Agent, or Firm*—David A. Mims, Jr.; Anthony V. S. England

(57) ABSTRACT

A method for deploying software includes providing a Web site on a server coupled to a network for presenting a user with an interface. The server has an array of post-load images stored thereon for combinations of the software and hardware that the user may select. The server receives a user selection of software applications for deploying to a target computer system and of hardware for the target system and responsively determines what drivers correspond to the indicated hardware. The server then selects a certain one of the post-load images having the software applications that have been selected by the user and has the drivers for the hardware that have been selected by the user.

10 Claims, 3 Drawing Sheets

METHOD, APPARATUS AND COMPUTER PROGRAM PRODUCT FOR DEPLOYING SOFTWARE VIA POST-LOAD IMAGES

BACKGROUND

1. Field of the Invention

The present invention relates to automating certain aspects of software deployment, and, more particularly, to providing an array of post-load images for combinations of software applications that a user may select for deployment to a target system.

2. Related Art

It can be a long and arduous process to install, restore, or configure, i.e., "set up," software on even a single computer system. Nevertheless, since computer systems are such essential tools most business enterprises of a substantial size have a multitude of them. Consequently, these enterprises face a daunting task to maintain their computer systems and an ever-changing array of software.

There have been a number of innovations for improving ease of set up. For example, US patents by Colligan et al., U.S. Pat. No. 6,519,762 B1, "Method and Apparatus for Restoration of a Computer System Hard Drive," and U.S. Pat. No. 6,298,443 B1, "Method And Software For Supplying A Computer Software Image To A Computer System" (collectively referred to herein as "Colligan"), deal with providing a software image or restoring a corrupted software image. According to Colligan, at the end of a manufacturing process for a computer a "factory download" image is placed on the computer's hard disk drive. Such a factory download image includes compressed files without file links and is referred to herein as a "pre-load" image. Colligan concerns, in particular, built-to-order computer systems. In one of these systems the pre-load image includes files for the operating system, applications, hardware and software drivers, etc., as ordered by a customer or as needed to support hardware ordered by the customer. Upon an initial power up of the computer, the customer installs the operating system and the software applications that were included with the order, which includes configuring user selectable preferences. This installation process changes the original pre-load image. For example, compressed files in the image are decompressed, additional files are created, and file linking occurs. Colligan provides a way to supply a secure copy of the pre-load image on a CD-ROM for a particular built-to-order computer system so that the pre-load image can be installed only on the particular system.

In another example, US patent by O'Connor et al., U.S. Pat. No. 5,745,568, "Method of Securing CD-ROM Data for Retrieval by One Machine," also concerns providing pre-load software images. O'Conner focuses in particular upon supplying encrypted pre-load software images, again with emphasis upon ensuring that the pre-load image can be installed only on one certain computer system.

While innovations in the prior art such as described above have been useful, nevertheless a need still exists for improvements in service to the computer user. For example, a need exists to provide a service that involves the user more directly in software deployment and to deploy the software to the user in a form that supports simplified computer set up.

SUMMARY OF THE INVENTION

The foregoing need is addressed in the present invention as follows. A method for deploying software includes providing a Web site on a service provider's computer system coupled to a network for presenting a user with an interface. The system has an array of images stored thereon for combinations of the software and hardware that the user may select. These images are not mere pre-load images, such as are conventionally provided for user installation. Rather, these images are "post-load" images, sometimes also referred to as "ghost" images. That is, while a post-load image may be compressed, keyed, or encrypted, the image is otherwise essentially identical to the image on a target computer system hard drive that results from the conventional installation process of a pre-load image, in which files in addition to those of the pre-load image are created, software applications of the pre-load image are configured, files are linked with drivers for hardware of the target system, etc. The provider's system is operable to receive a user selection of software applications for deploying to a target computer system and of hardware for the target system and responsively determine what drivers correspond to the indicated hardware. The provider's system then selects a certain one of the post-load images having the software applications that have been selected by the user and has the drivers particular to the hardware that has been selected by the user.

In another aspect, responsive to receiving an order the provider's system sends the user a loading utility with the selected image, wherein such a loading utility enables transferring the post-load image to the target computer system without relying on the target computer system having an operating system shell or boot diskette. One such loading utility, Norton Ghost, is offered by Symantec Corporation.

Additional objects, advantages, aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
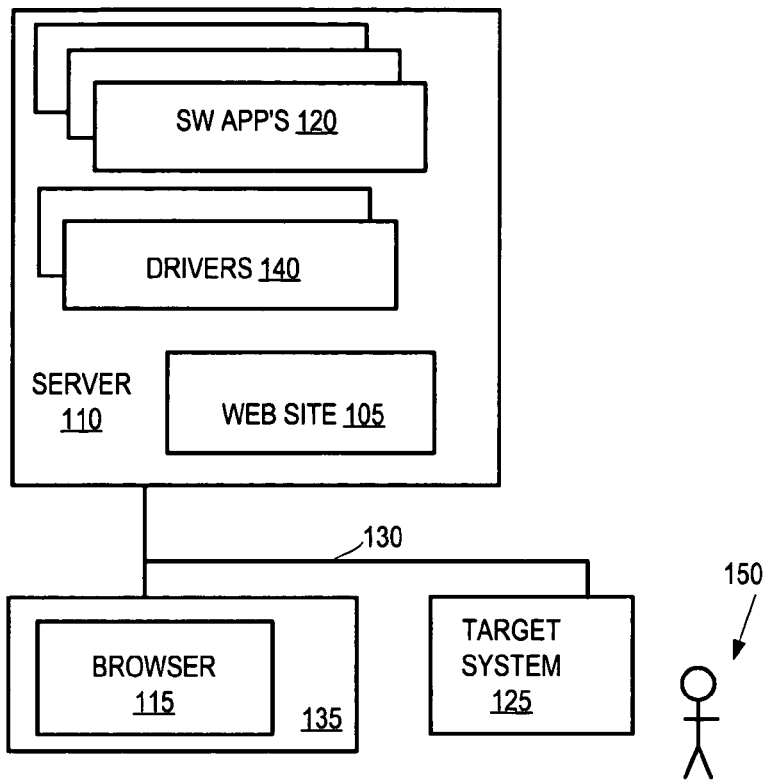
FIG. 1 illustrates a server coupled to a user's computer system by the Internet, including an interface by which the user may select software applications for installing on a target computer system, according to an embodiment of the present invention.

Referring now to FIG. 1, a Web site 105 for a service provider is provided on a server 110 for presenting a browser 115 of a user 150 with an interface by which the user 150 may select software applications 120 for installing on a target computer system 125. (Herein the term "applications" is meant to include operating systems and all manner of software.) That is, user 150 may access a first computer system, i.e., server 110, using a second, client computer system 135 that is coupled to server 110 via the Internet 130 in order to select software 120 offered on server 110 Web site 105 to be deployed to a third, target computer system 125. (Alternatively, the second computer system 135 may itself be the ultimate target system, in which case user 150 selects the software 120 for deploying to the second computer system 135, which will be reconfigured with the new software 120.)

User 150 also indicates to server 110 the nature of the hardware for target system 125. Server 110 responsively determines what drivers 140 are required for the indicated hardware of target system 125. For example, user 150 may indicate a certain manufacturer, model number and machine number for the target system 125. Such a manufacturer, model number and machine number specifies a certain set of hardware components, including, for example, a display, sound card, keyboard, mouse, etc. Server 110 looks up drivers 140 that correspond to the hardware components specified by the manufacturer, model number and machine number.

Figure 2:
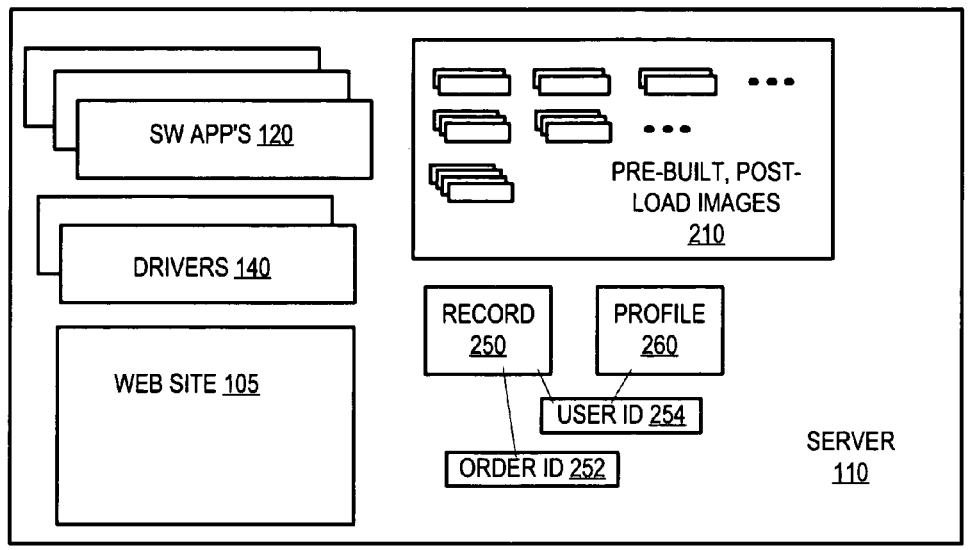
FIG. 2 illustrates additional aspects for processes and structure of the server of FIG. 1, according to an embodiment of the present invention.

Referring now to FIG. 2, additional aspects are illustrated for processes and structure of information on server 110. Web site 105 server 110 has an array of pre-built, post-load images 210 stored thereon for combinations of the software and hardware that the user may select. That is, for example, if the software applications 120 offered consist of applications X, Y and Z, and the drivers 140 consist of drivers U and V, the pre-built array of images 210 stored on server 110 include all the combinations of software applications 120 the user could select and drivers 140 for hardware the user could indicate, namely: XU, YU, ZU, XYU, XZU, YZU, XYZU, XV, YV, ZV, XYV, XZV, YZV and XYZV. (Of course, it should be understood that more than three software applications 120 and two drivers 140 are contemplated.).

Once the user 150 (FIG. 1) has selected software applications 120 and indicated the hardware for target system 125, from which server 110 determines corresponding drivers 140, the server 110 selects the corresponding one of the pre-built images 210 and provides user 150 with choices for delivery of the selected image 210. The delivery choices include downloading of image 210 over a high-speed Internet 130 (FIG. 1) connection and courier delivery on hard media, such as CD-ROM. Server 110 then responsively sends the target system 125 (FIG. 1) software image 210 to user 150.

Figure 3:
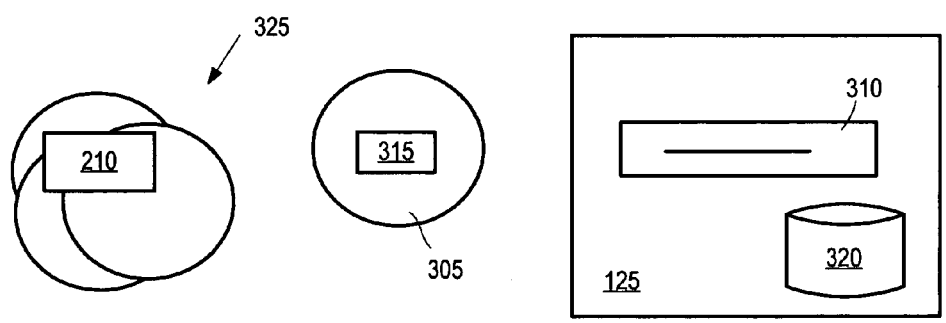
FIG. 3 illustrates additional aspects for processes and structure relating to the target computer system of FIG. 1.

Referring now to FIG. 3, additional aspects are illustrated for processes and structure relating to target system 125. In the illustrated embodiment of the invention, server 110 sends a "loading" utility 315 along with the selected target system image 210. Such a loading utility enables transferring an image to a computer system without relying on the computer system having an operating system shell or boot diskette. According to one embodiment, the load utility 315 is sent on bootable media 305, such as a floppy disk or a CD-ROM. In another embodiment, the utility 315 is sent via Internet connection 130 (FIG. 1) and the user 150 (FIG. 1) transfers the utility 315 to a bootable media 305.

Once the user 150 has received selected image 210, user 150 may simply transfer image 210 to target hardware system 125 without going through a conventional installation process. That is, according to a conventional installation process an operating system is initially installed using a bootable disk. Then individual software applications are installed, typically using an installation utility that is included in, or at least interacts with, the operating system. In contrast, according to one arrangement for the present invention, the target computer system 125 may not have any operating system installed, or the OS may be nonfunctioning. In such a case, the user merely inserts into a disk drive 310 of the target system 125 disk 305 with utility 315. This is done with the system 125 turned off. Upon been turned on, the target system 125 automatically boots to the utility 315, which has instructions for causing the system 125 to automatically transfer the image 210 to a hard drive 320 of the system 125. This may include leading the user 150 (FIG. 1) through some very simple user interaction, such as inputting user authentication for license verification purposes, inputting an indication of the target system drive 320 on to which the user 150 wants the image 210 copied, changing disks 325 if the image 210 spans multiple disks 325 as in FIG. 3, etc. Thus, the target system 125 OS is not required or used at all for transferring the image 210. Indeed, if target system 125 has an operating system on its hard drive 320, when user 150 powers up the target system 125 and it boots to disk 305, the instructions of the utility program 315 cause system 125 to reformat the hard drive 320 or at least erase the previous contents of the drive 320, including the operating system.

After the target system 125 image 210 has been transferred, user 150 removes the bootable load utility 315 media 305, shuts down and restarts (or at least reboots) the system 125, and the system 125 then boots to the newly transferred image 210 on target system 125 hard drive 320.

Referring again to FIG. 2, according to one embodiment of the invention, the service provider also sells computers via the Web site 105 and permits purchasers to select and configure software 120 for delivery with the computers using the same browser 115 (FIG. 1) interface. Web site 105 also establishes and maintains a record 250 on server 110 with an order identifier 252 and user identifier 254 commemorating the computer or software order, so that if the user 150 (FIG. 1) wishes to selectively upgrade the software programs 120 that were earlier provided to user 150, or wishes to obtain software programs 120 in addition to those that were earlier provided, the server selects a different one of the pre-built images 210 that includes the previously obtained software programs 120, as selectively updated, and the new software programs 120. The price that server 110 calculates for the new image 210 reflects lower, upgrade prices for software that is merely upgraded. In addition, server 110 maintains a profile 260 of user 150 that is associated with the user identifier 254. User 150 provides server 110 with information for the profile 260 that informs server 110 about the user's wants or needs, such as the user's spoken language, physical impairments, special interests, nature of work, education, etc.

It is an advantage of this arrangement that once the user identifier 254 or order identifier 252 is provided to server 110 the server 110 may easily select and deliver a replacement image 210 for target system 125, even if the user 150 has not kept, or did not originally obtain, a copy of the target system image 210 other than the image 210 on the target system 125 hard drive 320 itself. Also, based on user identifier 254 or order identifier 252 server 110 responsively presents to user 150 via browser 115 a list of the previously obtained software 120, so that the user 150 may easily make changes to the original target system 125 image 210 before obtaining a replacement. Further, the Web site 105 presents a comparison of the original software 120 versions to new releases that are presently available so that user 150 may more easily select upgraded versions of the software 120.

Besides suggesting upgraded versions of the same software programs that the user 150 has previously selected, the Web site 105 server 110 may even make suggestions about other software programs 120 that the server 110 determines are likely to be desirable for user 150 responsive to the user's previously selected programs 120 indicated in record 250 or responsive to information about user 150 contained in profile 260.

Figure 4:
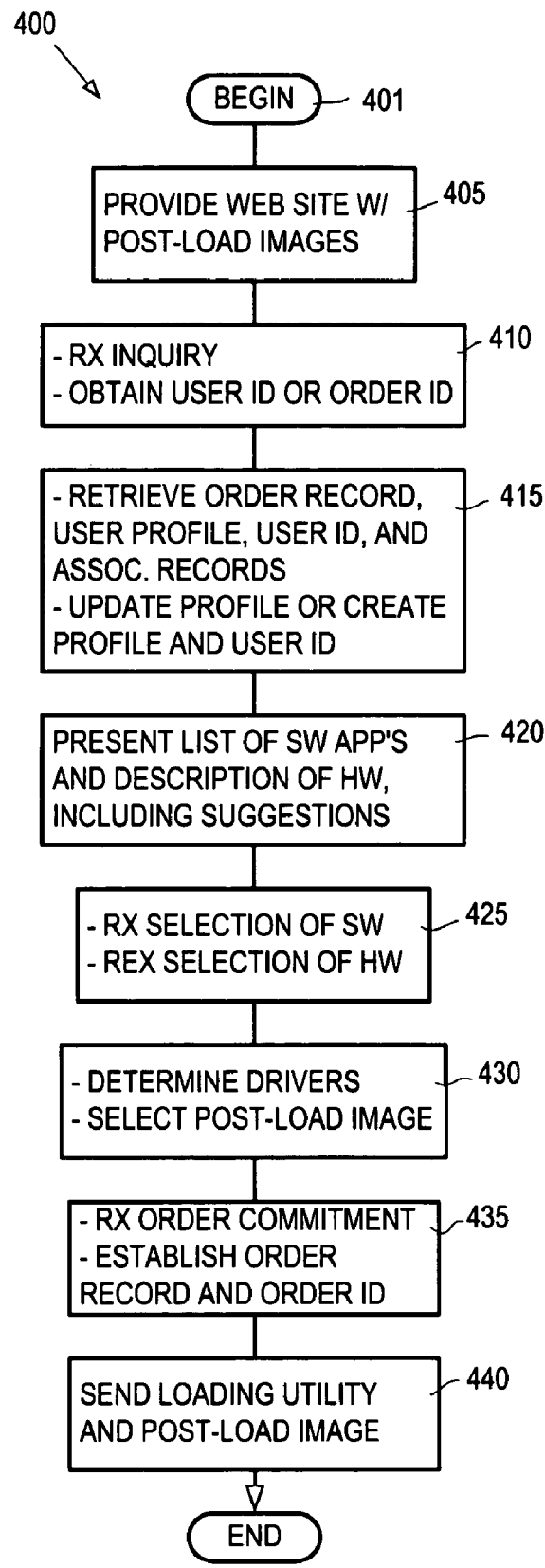
FIG. 4 illustrates, in the form of a flow chart, certain logical processes of the server of FIGS. 1 and 2, according to an embodiment of the present invention.

Referring now to FIG. 4, logical processes of server 110 (FIGS. 1 and 2) are illustrated, according to an embodiment of the present invention. Algorithm 400 begins at 401. Then, at 405 a Web site is provided on a server coupled to a network, such as the Internet, for presenting a user with an interface via the user's browser on the user's computer system. The server has an array of pre-built, post-load images stored thereon for combinations of the software and hardware that the user may select. Next, at 410 the server receives an inquiry from a user, via the network, and obtains a user or order identifier if there has been a previous transaction with the user. This may be obtained from a cookie on the user's computer system or by requesting and receiving it from input entered by the user.

The server maintains a record of orders that memorializes software applications and drivers that are included in images that are purchased. Each record is associated with a unique order identifier that the server establishes for the order and the target computer system, and a user identifier that the server establishes for the "user," which may be the person that will use the software on the target system or an administrator for the enterprise making the order commitment. The server also maintains a profile of each user that is associated with the user's identifier. The profile includes information from the user that informs the server about the user's needs.

If the server receives an order identifier, then, at 415, the server responsively retrieves the order record for the previous order identifier at 415. If the server receives a user identifier or else retrieves a previous order record, then, also at 415 the server uses the user identifier to responsively retrieve the profile for the user and any order records for previous orders associated with the user identifier. If this is the first order for the user, the server, also at 415, queries and receives from the user information for a new user profile that informs the server about the user's needs. Accordingly, the server establishes a user identifier for the new user profile and populates the profile with the received information, also at 415. If this is not the first order, the server queries and possibly receives updated information for the user profile, and accordingly updates the profile.

Next, at 420 the server presents to the user a description of target system hardware and a list of the software applications and drivers included in images that have been previously ordered. The list is from information included in the retrieved order records. This also includes, at 420, presenting a list of suggested updates for the software programs of the previous order or orders associated with the user or order identifier. Such a suggested "update" may include a new release for the previously ordered software or an upgrade to a more full featured version of the software. This further includes, at 420, a list of suggested software programs for the new order in addition to those indicated in the order records of the previous order or orders.

Next the server receives from the user, at 425, a selection of software applications for deploying to the user's target computer system, and receives from the user, also at 425, a selection of hardware for the target system. This includes a selection from the user indicating ones of the software programs of the first order to update for the second order or indicating software programs for the second order in addition to those of the first order.

Then, at 430, the server determines what drivers for the user selected software applications correspond to the user indicated hardware. (The server has a pre-built array of software images stored thereon for combinations of the software and hardware that the user may select.) Also at 430, the server selects a certain one of the pre-built images, i.e., the one of the images that has the software applications selected by the user and the drivers for those software applications and for the hardware selected by the user. Thus, the selected image is deployable to the target system hardware.

Next, at 435, the server receives an order commitment from the user for the selected image, which includes a selection by the user of a method for delivery of the selected image. Responsive to the order, also at 435, the server establishes a new order record and associated order identifier and presents it to the users. Then, at 440, the server sends the user a loading utility (as described herein above) with the selected image and the order identifier. This may be by electronic transfer or courier, as previously described.

Figure 5:
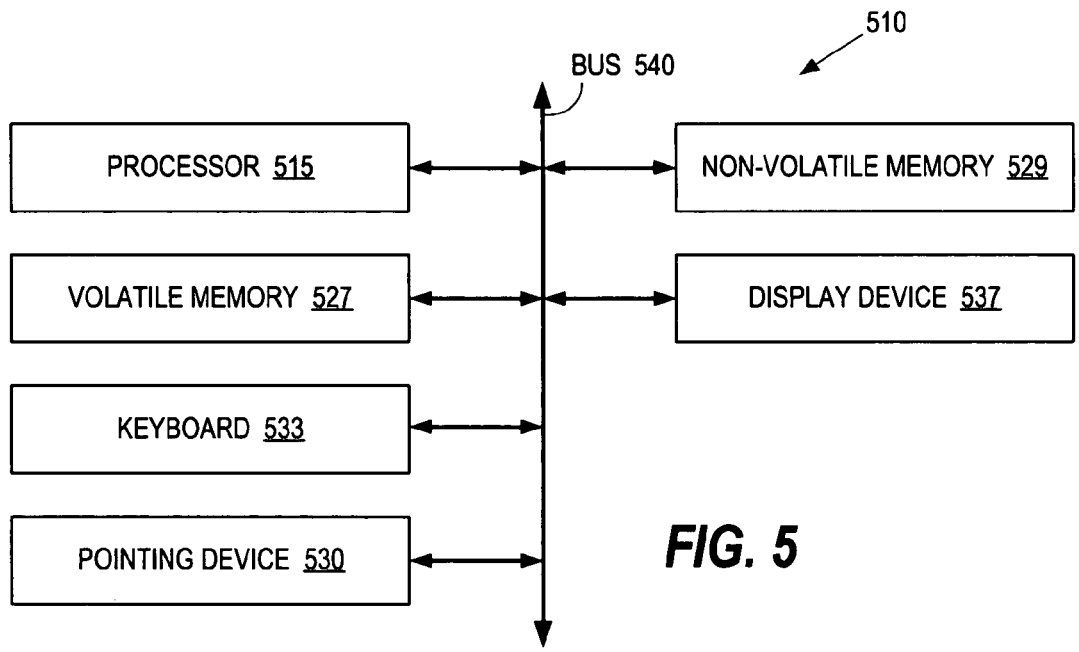
FIG. 5 illustrates a computer system suitable for the server, target system or user system of FIG. 1, according to an embodiment of the present invention.

Referring to FIG. 5, a block diagram is shown illustrating a computer system 510 suitable for server 110, target system 125 or user system 135 of FIG. 1, according to an embodiment of the present invention. In various embodiments, system 510 takes a variety of forms, including a personal computer system, mainframe computer system, workstation, server, Internet appliance, PDA, an embedded processor with memory, etc. That is, it should be understood that the term "computer system" is intended to encompass any device having a processor that executes instructions from a memory medium. Likewise, although the term "server" is used herein above and server 110 is shown in FIG. 1, it should be understood that the computer system hosting the service provider's Web site may take a variety of forms in different embodiments of the invention and is not necessarily limited to a so-called "server."

The system 510 includes a processor 515, a volatile memory 527, e.g., RAM, a keyboard 533, a pointing device 530, e.g., a mouse, a nonvolatile memory 529, e.g., ROM, hard disk, floppy disk, CD-ROM, and DVD, and a display device 537 having a display screen. Memory 527 and 529 are for storing program instructions (also known as a "software program"), which are executable by processor 515, to implement various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries. Components included in system 510 are interconnected by bus 540. A communications device (not shown) may also be connected to bus 540 to enable information exchange between system 510 and other devices.

Note that software applications 120 on the Web site 105 of FIGS. 1 and 2 are not necessarily limited to those developed by the service provider, but may include software developed by numerous others. In fact, given the diversity of applications ordinarily installed on modern-day computer systems it is preferred that the Web site offers software products from a wide array of developers. This arrangement is advantageous because, among other reasons, the Web site provides a one-stop-shop for the user. In this manner the Web site not only saves the user time in terms of the effort to install and configure software on the target system, but also in terms of the effort to acquire the various software products for installing and configuring.

This arrangement has numerous other advantageous as well. It facilitates quick and easy deployment of software for restoring a system that has crashed or been infected by a virus or otherwise corrupted, particularly since a record is maintained for a user, the user's target system and previously obtained software, so that the user does not have to remember and enumerate the hardware features of the target system nor the software applications required to be restored. Also, it facilitates quick and easy deployment of software updates, to obtain the most recent service packs, anti-virus utilities and security patches.

The invention, in its various forms, is also advantageous because it facilitates comparison of the software offerings. It facilitates cheaper offerings because the service provider may exercise volume buying power and may incur reduced packaging expenses. In one embodiment of the invention user identifiers may be grouped with other users or associated with a large user entity so that when a user purchases software from the service provider according to the arrangement described herein the server deploying the software grants a volume discount to the user based on volume associated with the user's group or entity.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

Many additional aspects, modifications and variations are also contemplated and are intended to be encompassed within the scope of the following claims. For example, according to one embodiment, the Web site presents not only a number of software applications that the user may choose to deploy, and for which the server has pre-built images, but also presents representations to the user of a variety of pre-built directory structures that the user can select from to produce a desired directory structure for the target system. Thus, the user may select a directory structure in which each software application has its own directory (aka "folder") branching directly to the root directory. Alternatively, the user may select a single, Programs directory branching directly to the root directory, with the Programs directory containing each of the respective application directories, for example.

In yet another embodiment, a custom image of the selected software for the target system, configured according to selected directory structure for the specified hardware, is built after the user selections and specifications are entered. That is, according to this embodiment not all the possible combinations of software, directory structure and hardware are predetermined and pre-built.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. An apparatus for deploying software, comprising:
    a processor;
    a memory for storing program instructions executable by the processor to perform the steps of:
        providing a Web site on a first computer system coupled to a network for presenting users with an interface, wherein the users include purchasers;
        receiving from the user a selection of software applications for deploying to a target computer system;
        receiving from a user a selection of hardware for the target computer system and responsively determining what drivers correspond to the selected hardware, wherein the first computer system has a pre-built array of post-load images stored thereon for combinations of hardware and the software applications that the user may select, the post-load images being substantially identical to respective images resulting on a target computer system hard drive from an installation process of corresponding pre-load images, so that the respective post-load images include software application configuration information, files from the corresponding pre-load images, and links to drivers for hardware of the target computer system;
        selecting a certain one of the pre-built images by the first computer system responsive to the received user selections, wherein the selected image has the software applications selected by the user and the drivers for the hardware selected by the user; and
        receiving a first order from the user for the certain image of the selected software applications deployable to the target computer system hardware, including a selection by the user of a method for delivery of the selected image;
    sending the selected image, the image sent being limited to the selected pre-built, post-load image;
        maintaining a record of the order for the software applications and drivers included in the certain image that is sent, wherein the record is associated with an order identifier and user identifier;
        receiving a second order for the user, including the user or order identifier; retrieving the record for the first order responsive to the user or order identifier; and
        presenting, responsive to the user or order identifier, a list of suggested software programs for the second order in addition to those of the first order.

2. The apparatus of claim 1, wherein the sending of the loading utility with the selected image further includes sending the loading utility on bootable media, and wherein the utility further includes instructions for causing the target computer system to transfer the image to a hard drive of the target computer system responsive to the target computer system booting to the utility on the bootable media when the target computer system is turned on.

3. The apparatus of claim 1, wherein the program instructions are executable by the processor to perform the further steps of:
    presenting a list of the software applications and drivers included in the certain image that was sent for the first order; and
    receiving a selection indicating ones of the software applications of the first order to update for the second order or indicating software programs for the second order in addition to those of the first order.

4. The apparatus of claim 1, wherein the program instructions are executable by the processor to perform the further steps of:
    presenting, responsive to the user or order identifier, a list of suggested updates for the software programs of the first order.

5. The apparatus of claim 1, wherein the program instructions are executable by the processor to perform the further steps of:
    receiving user information that informs the computer system about needs of the user;

maintaining a profile of the user, wherein the profile is associated with the user identifier and the received user information; and presenting, responsive to the user information, a list of suggested updates for the software programs of the first order or a list of suggested software programs for the second order in addition to those of the first order.

6. A computer program product, stored on a recordable-type computer readable medium, for deploying software, said computer program product having instructions for execution by a computer, wherein the instructions cause the computer to implement a method when executed by the computer, the computer program product comprising:

instructions for providing a Web site on a first computer system coupled to a network for presenting users with an interface, wherein the users include purchasers;

instructions for receiving from a user a selection of software applications for deploying to a target computer system;

instructions for receiving from the user a selection of hardware for the target computer system and responsively determining what drivers correspond to the selected hardware, wherein the first computer system has a pre-built array of post-load images stored thereon for combinations of hardware and the software applications that the user may select, the respective post-load images being substantially identical to images resulting on a target computer system hard drive from an installation process of corresponding pre-load images, so that the respective post-load images include software application configuration information, files from the corresponding pre-load images, and links to drivers for hardware of the target computer system;

instructions for selecting a certain one of the pre-built images by the first computer system responsive to the received user selections, wherein the selected image has the software applications selected by the user and the drivers for the hardware selected by the user; and instructions for receiving a first order from the user for the certain image of the selected software applications deployable to the target computer system hardware, including a selection by the user of a method for delivery of the selected image; instructions for sending the selected image, the image sent being limited to the selected pre-built, post-load image;

instructions for maintaining a record of the order for the software application and drivers included in the certain image that is sent, wherein the record is associated with an order identifier and user identifier;

instructions for receiving a second order for the user, including the user or order identifier;

instructions for retrieving the record for the first order responsive to the user or order identifier; and instructions for presenting, responsive to the user or order identifier, a list of suggested software program for the second order in addition to those of the first order.

7. The computer program product of claim 6, wherein the sending of the loading utility with the selected image further includes sending the loading utility on bootable media, and wherein the utility further includes instructions for causing the target computer system to transfer the image to a hard drive of the target computer system responsive to the target computer system booting to the utility on the bootable media when the target computer system is turned on.

8. The computer program product of claim 6, further comprising:

instructions for presenting a list of the software applications and drivers included in the certain image that was sent for the first order; and instructions for receiving a selection indicating ones of the software applications of the first order to update for the second order or indicating software programs for the second order in addition to those of the first order.

9. The computer program product of claim 6, further comprising:

instructions for presenting, responsive to the user or order identifier, a list of suggested updates for the software programs of the first order.

10. The computer program product of claim 6, further comprising:

instructions for receiving user information that informs the computer system about needs of the user;

instructions for maintaining a profile of the user, wherein the profile is associated with the user identifier and the received user information; and instructions for presenting, responsive to the user information, a list of suggested updates for the software programs of the first order or a list of suggested software programs for the second order in addition to those of the first order.

* * * * *